US 12,012,554 B2

(12) United States Patent
Al-Herz et al.

(10) Patent No.: US 12,012,554 B2
(45) Date of Patent: *Jun. 18, 2024

(54) PROCESS AND CATALYST FORMULATION FOR CRACKING CRUDE OIL TO PRODUCE LIGHT OLEFINS AND AROMATICS

(71) Applicant: Saudi Arabian Oil Company, Dhahran (SA)

(72) Inventors: Mansour Ali Al-Herz, Al-Ahsa (SA); Musaed Salem Al-Ghrami, Dammam (SA); Qi Xu, Dhahran (SA); Aaron Akah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,186

(22) Filed: Jul. 6, 2022

(65) Prior Publication Data
US 2024/0010926 A1    Jan. 11, 2024

(51) Int. Cl.
*C10G 11/05* (2006.01)
*B01J 21/04* (2006.01)
(Continued)

(52) U.S. Cl.
CPC ............. *C10G 11/05* (2013.01); *B01J 21/04* (2013.01); *B01J 21/08* (2013.01); *B01J 21/16* (2013.01);
(Continued)

(58) Field of Classification Search
CPC ...... C10G 11/05; C10G 2400/20; B01J 21/04; B01J 21/08; B01J 21/16; B01J 29/40; B01J 37/0201
See application file for complete search history.

(56) References Cited

U.S. PATENT DOCUMENTS

| 5,318,695 A | 6/1994 | Eberly et al. |
| 7,019,187 B2 | 3/2006 | Powers |

(Continued)

FOREIGN PATENT DOCUMENTS

| EP | 3623043 A1 | 3/2020 |
| WO | 2009073436 A2 | 6/2009 |

(Continued)

OTHER PUBLICATIONS

Al-Absi et al., "Thermal and catalytic cracking of whole crude oils at high severity", Journal of Analytical and Applied Pyrolysis, vol. 145, 104705, 11 pages, 2020.

(Continued)

*Primary Examiner* — Prem C Singh
*Assistant Examiner* — Brandi M Doyle
(74) *Attorney, Agent, or Firm* — DINSMORE & SHOHL LLP (57) ABSTRACT

A process for converting crude oil to light olefins, aromatics, or both, includes contacting a crude oil with an FCC catalyst composition in a catalytic cracking system at a temperature of greater than or equal to 580° C., a weight ratio of the FCC catalyst to the crude oil of from 2:1 to 10:1, and a residence time of from 0.1 seconds to 60 seconds. Contacting causes at least a portion of hydrocarbons in the crude oil to undergo cracking reactions to produce a cracked effluent comprising at least olefins. The FCC catalyst composition for producing olefins and aromatics from crude oil includes ultrastable Y-type zeolite impregnated with lanthanum, ZSM-5 zeolite impregnated with phosphorous, an alumina binder, colloidal silica, and a matrix material comprising Kaolin clay.

19 Claims, 1 Drawing Sheet

(51) Int. Cl.
  *B01J 21/08* (2006.01)
  *B01J 21/16* (2006.01)
  *B01J 29/40* (2006.01)
  *B01J 37/02* (2006.01)

(52) U.S. Cl.
  CPC .......... *B01J 29/40* (2013.01); *B01J 37/0201* (2013.01); *C10G 2400/20* (2013.01)

(56) References Cited

U.S. PATENT DOCUMENTS

| | | |
|---|---|---|
| 7,459,596 B1 | 12/2008 | Abrevaya et al. |
| 8,137,533 B2 | 3/2012 | Towler et al. |
| 9,284,492 B2 | 3/2016 | Al-Ghrami et al. |
| 10,059,642 B1 | 8/2018 | Al-Herz et al. |
| 10,954,457 B2 | 3/2021 | Al-Herz et al. |
| 2005/0211603 A1 | 9/2005 | Guillaume et al. |
| 2011/0083996 A1 | 4/2011 | Shafi et al. |
| 2014/0275673 A1 | 9/2014 | Long et al. |
| 2017/0369397 A1* | 12/2017 | Al-Herz ................. B01J 29/088 |
| 2019/0040328 A1* | 2/2019 | Koseoglu ............... C10G 69/02 |
| 2020/0255753 A1 | 8/2020 | Al-Herz et al. |
| 2020/0291306 A1* | 9/2020 | Aitani ................. C10G 51/026 |

FOREIGN PATENT DOCUMENTS

| | | |
|---|---|---|
| WO | 2010009077 A2 | 1/2010 |
| WO | 2010009082 A1 | 1/2010 |
| WO | 2010009089 A2 | 1/2010 |
| WO | 2013142563 A2 | 9/2013 |
| WO | 2022056235 A1 | 3/2022 |

OTHER PUBLICATIONS

Chen et al., "Novel Propylene Production Route: Utilizing Hydrotreated Shale Oil as Feedstock via Two-Stage Riser Catalytic Cracking", Energy & Fuels, vol. 29, pp. 7190-7195, 2015.

Corma et al., "Crude oil to chemicals: light olefins from crude oil", Catalysis Science & Technology, vol. 7, No. 12, 35 pages, 2017.

Usman et al., "Catalytic cracking of crude oil to light olefins and naphtha: Experimental and kinetic modeling", Chemical Engineering Research and Design, vol. 120, pp. 121-137, 2017.

Notification of Transmittal of the International Search Report and Written Opinion of the International Searching Authority, or the Declaration dated Sep. 18, 2023 pertaining to International application No. PCT/US2023/068991 filed Jun. 23, 2023, 11 pages.

* cited by examiner

PROCESS AND CATALYST FORMULATION FOR CRACKING CRUDE OIL TO PRODUCE LIGHT OLEFINS AND AROMATICS

BACKGROUND

Field

The present disclosure relates to processes and catalysts formulations for processing petroleum-based materials and, in particular, processes and catalyst compositions for cracking hydrocarbon feeds to produce olefins and aromatics.

Technical Background

The worldwide increasing demand for light olefins remains a major challenge for many integrated refineries. In particular, the production of some valuable light olefins, such as ethylene and propylene, has attracted increased attention as pure olefin streams are considered the building blocks for polymer synthesis. The production of light olefins depends on several process variables, such as the feed type, operating conditions, and the type of catalyst. Despite the options available for producing a greater yield of propylene and light olefins, intense research activity in this field is still being conducted. For example, light olefins are typically produced through thermal cracking (or steam pyrolysis) of petroleum gases and distillates, such as naphtha, kerosene, or gas oil. Light olefins may also be produced through fluid catalytic cracking processes. Typical hydrocarbon feeds for fluid catalytic cracking processes range from hydrocracked bottoms to heavy feed fractions such as vacuum gas oil and atmospheric residue; however, these hydrocarbon feeds are limited, at least in part, due to limitations of conventional catalysts used in fluid catalytic cracking processes.

SUMMARY

Accordingly, there is an ongoing need for processes for cracking hydrocarbon feeds to produce olefins with a greater selectivity and yield of light olefins from hydrocarbon feeds compared to conventional methods for cracking hydrocarbon feeds. The processes of the present disclosure include the processing of a hydrocarbon feed in a fluid catalytic cracking unit with an FCC catalyst composition. In particular, the methods of the present disclosure include contacting the hydrocarbon feed with an FCC catalyst composition that comprises a ZSM-5 zeolite and an ultrastable Y-type zeolite. The inclusion of these different zeolitic components can allow for increase in the selectivity and yield of light olefins across the entire range of some unconventional hydrocarbon feeds for fluid catalytic cracking processes, such as crude oil. Further, the FCC catalyst composition may demonstrate a reduced deactivation rate, which may improve the economics of light olefin production, among other features.

According to at least one aspect of the present disclosure, a process for converting crude oil to light olefins, aromatics, or both, comprises contacting a crude oil with an FCC catalyst composition in a FCC catalytic cracking system at a temperature of greater than or equal to 580° C., a weight ratio of the FCC catalyst to the crude oil of from 2:1 to 10:1, and a residence time of from 0.1 seconds to 60 seconds, where the FCC catalyst can comprise ultrastable Y-type zeolite (USY zeolite) impregnated with lanthanum, ZSM-5 zeolite impregnated with phosphorous, an alumina binder, colloidal silica, and a matrix material comprising Kaolin clay and contacting can cause at least a portion of hydrocarbons in the crude oil to undergo cracking reactions to produce a cracked effluent comprising at least olefins.

According to at least one aspect of the present disclosure, an FCC catalyst composition for producing olefins and aromatics from crude oil can comprise ultrastable Y-type zeolite (USY zeolite) impregnated with lanthanum, ZSM-5 zeolite impregnated with phosphorous, an alumina binder, colloidal silica, and a matrix material comprising Kaolin clay.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWING

The following detailed description of the present disclosure may be better understood when read in conjunction with the following drawing in which.

Figure 1:
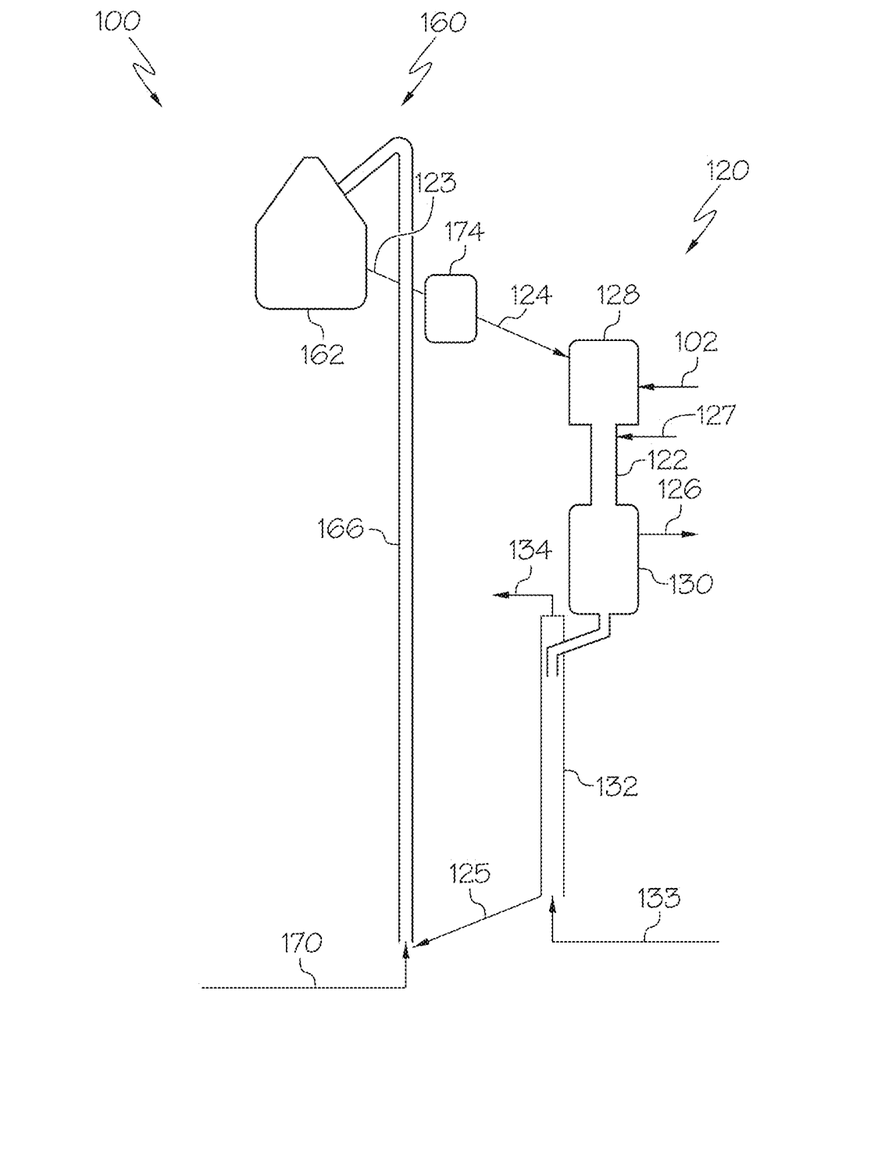
FIG. 1 schematically depicts a generalized flow diagram of a system for converting a hydrocarbon feed to produce olefins, according to one or more aspects of the present disclosure.

When describing the simplified schematic illustration of FIG. 1, the numerous valves, temperature sensors, electronic controllers, and the like, which may be used and are well known to a person of ordinary skill in the art, are not included. Further, accompanying components that are often included in systems such as those depicted in FIG. 1, such as air supplies, heat exchangers, surge tanks, and the like are also not included. However, a person of ordinary skill in the art understands that these components are within the scope of the present disclosure.

Additionally, the arrows in the simplified schematic illustration of FIG. 1 refer to process streams. However, the arrows may equivalently refer to transfer lines, which may transfer process steams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustration of FIG. 1 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Reference will now be made in greater detail to various aspects, some of which are illustrated in the accompanying drawings.

DETAILED DESCRIPTION

The present disclosure is directed to catalyst compositions and processes for upgrading crude oil and other heavy hydrocarbon streams through fluidized catalytic cracking to produce greater value chemical products and intermediates, such as but not limited to light olefins, aromatic compounds, and combinations thereof. The FCC catalyst compositions of the present disclosure can comprise an ultrastable Y-type zeolite (USY zeolite) impregnated with lanthanum, a ZSM-5 zeolite impregnated with phosphorous, an alumina binder, colloidal silica, and a matrix material comprising Kaolin clay. The processes of the present disclosure include contacting a crude oil or other heavy hydrocarbon stream with the FCC catalyst composition in a FCC catalytic cracking system at a temperature of greater than or equal to 580° C., a weight ratio of the FCC catalyst to the crude oil of from 2:1 to 10:1, and a residence time of from 0.1 seconds to 60 seconds.

The FCC catalyst compositions and processes of the present disclosure can enable direct fluidized catalytic cracking of heavy hydrocarbon feeds comprising crude oils, such as Arab light crude oil. The FCC catalyst compositions of the present disclosure can enable efficient cracking of crude oil feed streams while at the same time exhibiting a reduced rate of deactivation of the FCC catalyst composition due to contaminants and coke formation, among other features.

As used in the present disclosure, the term "cracking" refers to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. As used in the present disclosure, the term "catalytic cracking" refers to cracking conducted in the presence of a catalyst. Some catalysts may have multiple forms of catalytic activity, and calling a catalyst by one particular function does not render that catalyst incapable of being catalytically active for other functionality.

As used in the present disclosure, the term "catalyst" refers to any substance that increases the rate of a specific chemical reaction, such as cracking reactions.

As used in the present disclosure, the term "used catalyst" refers to catalyst that has been contacted with reactants at reaction conditions, but has not been regenerated in a regenerator. The "used catalyst" may have coke deposited on the catalyst and may include partially coked catalyst as well as fully coked catalysts. The amount of coke deposited on the "used catalyst" may be greater than the amount of coke remaining on the regenerated catalyst following regeneration. The "used catalyst" may also include catalyst that has a reduced temperature due to contact with the reactants compared to the catalyst prior to contact with the reactants.

As used in the present disclosure, the term "regenerated catalyst" refers to catalyst that has been contacted with reactants at reaction conditions and then regenerated in a regenerator to heat the catalyst to a greater temperature, oxidize and remove at least a portion of the coke from the catalyst to restore at least a portion of the catalytic activity of the catalyst, or both. The "regenerated catalyst" may have less coke, a greater temperature, or both, compared to used catalyst and may have greater catalytic activity compared to used catalyst. The "regenerated catalyst" may have more coke and lesser catalytic activity compared to fresh catalyst that has not passed through a cracking reaction zone and regenerator.

As used in the present disclosure, the term "deactivated catalyst" refers to a catalyst that has lost function and differs from used catalyst, in that the deactivated catalyst is generally not capable of being regenerated in the regenerator during steady state operation of the regeneration system. The deactivated catalyst can be deactivated by contaminants and/or metals in the hydrocarbon feed or a steam feed depositing on the surfaces of the catalyst.

As used in the present disclosure, the term "crude oil" refers to a mixture of petroleum liquids and gases, including impurities, such as sulfur-containing compounds, nitrogen-containing compounds, and metal compounds, extracted directly from a subterranean formation or received from a desalting unit without having any fractions, such as naphtha, separated by distillation.

As used in the present disclosure, the term "naphtha" refers to an intermediate mixture of hydrocarbon-containing materials derived from crude oil refining and having atmospheric boiling points from 36 degrees Celsius (° C.) to 220° C. Naphtha may comprise light naphtha comprising hydrocarbon-containing materials having atmospheric boiling points from 36° C. to 80° C., intermediate naphtha comprising hydrocarbon-containing materials having atmospheric boiling points from 80° C. to 140° C., and heavy naphtha comprising hydrocarbon-containing materials having atmospheric boiling points from 140° C. to 200° C. Naphtha may comprise paraffinic, naphthenic, and aromatic hydrocarbons having from 4 carbon atoms to 11 carbon atoms.

As used in the present disclosure, the term "directly" refers to the passing of materials, such as an effluent, from a first component of the FCC system 100 to a second component of the FCC system 100 without passing the materials through any intervening components or systems operable to change the composition of the materials. Similarly, the term "directly" also refers to the introducing of materials, such as a feed, to a component of the FCC system 100 without passing the materials through any preliminary components operable to change the composition of the materials. Intervening or preliminary components or systems operable to change the composition of the materials can include reactors and separators, but are not generally intended to include heat exchangers, valves, pumps, sensors, or other ancillary components required for operation of a chemical process. Further, combining two streams together upstream of the second component instead of passing each stream to the second component separately is also not considered to be an intervening or preliminary component operable to change the composition of the materials.

As used in the present disclosure, the terms "downstream" and "upstream" refer to the positioning of components or systems of the FCC system 100 relative to a direction of flow of materials through the FCC system 100. For example, a second component may be considered "downstream" of a first component if materials flowing through the FCC system 100 encounter the first component before encountering the second component. Likewise, the first component may be considered "upstream" of the second component if the materials flowing through the FCC system 100 encounter the first component before encountering the second component.

As used in the present disclosure, the term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed. For example, a slipstream may carry some of the effluent away, meaning that only a portion of the effluent may enter the downstream component or system. The terms "reaction effluent" and "reactor effluent" particularly refer to a stream that is passed out of a reactor or reaction zone.

As used in the present disclosure, the term "high-severity conditions" refers to operating conditions of a fluid catalytic cracking system, such as the FCC system 100, that include temperatures greater than or equal to 580° C., or from 580° C. to 750° C., a catalyst to oil ratio greater than or equal to 1:1, or from 1:1 to 60:1, and a residence time of less than or equal to 60 seconds, or from 0.1 seconds to 60 seconds, each of which conditions may be more severe than typical operating conditions of fluid catalytic cracking systems.

As used in the present disclosure, the term "catalyst to oil ratio" or "CTO weight ratio" refers to the weight ratio of a catalyst, such as the FCC catalyst composition of the FCC system 100, to a process stream comprising hydrocarbons, such as the hydrocarbon feed 102 of the FCC system 100.

The term "residence time" refers to the amount of time that reactants, such as the hydrocarbons in the hydrocarbon feed 102 of the FCC system 100, are in contact with a catalyst, at reaction conditions, such as at the reaction temperature.

As used in the present disclosure, the term "reactor" refers to any vessel, container, conduit, or the like, in which a chemical reaction, such as catalytic cracking, occurs between one or more reactants optionally in the presence of one or more catalysts. A reactor can include one or a plurality of "reaction zones" disposed within the reactor. The term "reaction zone" refers to a region in a reactor where a particular reaction takes place.

As used in the present disclosure, the terms "separation unit" and "separator" refer to any separation device(s) that at least partially separates one or more chemical constituents in a mixture from one another. For example, a separation system selectively separates different chemical constituents from one another, forming one or more chemical fractions. Examples of separation systems include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, or combinations of these. The separation processes described in the present disclosure may not completely separate all of one chemical constituent from all of another chemical constituent. Instead, the separation processes described in the present disclosure "at least partially" separate different chemical constituents from one another and, even if not explicitly stated, separation can include only partial separation.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "heavy oil stream" passing to a first system component or from a first system component to a second system component should be understood to equivalently disclose "heavy oil" passing to the first system component or passing from a first system component to a second system component.

The composition of feed streams and processing variables of FCC systems play a significant role on the reaction yields and heat balance within the systems. Conventional FCC systems and processes can require costly refining to produce suitable feed streams. Such additional costly refining can include separating and processing of one or more fractions of a hydrocarbon feedstock before introducing the refined conventional feed into the FCC system. These additional processing steps are energy intensive and reduce the amount of viable feed from an existing hydrocarbon source. Previous systems and methods have been developed to convert crude oil to greater value chemical products and intermediates directly through catalytic cracking to attempt to overcome these limitations, such as by reducing or eliminating the processing steps needed to produce a suitable hydrocarbon feed before introduction into an FCC system. However, contaminants, metals, or both present in heavy hydrocarbon feeds, such as crude oil, can deactivate the catalyst, resulting in decreased yields and increased production costs.

Accordingly, aspects of the present disclosure are directed to FCC catalyst compositions and processes for converting crude oil directly to greater value chemical products and intermediates, such as but not limited to olefins and aromatic compounds, through FCC systems using the FCC catalyst compositions and reaction conditions that result in efficient cracking of the crude oil, while resisting deactivation of the catalyst. The FCC catalyst composition of the present disclosure includes a ZSM-5 zeolite, an ultrastable Y-type zeolite, an alumina binder, a matrix material comprising Kaolin clay, and colloidal silica. The processes of the present disclosure include contacting a crude oil feed stream with the FCC catalyst composition in a FCC catalytic cracking system at high severity conditions sufficient to convert at least a portion of the crude oil feed stream to light olefins, aromatic compounds, or both. The FCC catalyst compositions and reaction conditions of the processes of the present disclosure can enable the crude oil to be directly converted to light olefins, aromatic compounds, or both efficiently while resisting deactivation, among other features.

Referring now to FIG. 1, the FCC system 100 of the present disclosure for processing a hydrocarbon feed 102 to produce olefins is schematically depicted. The FCC system 100 may comprise a fluid catalytic cracking unit 120 and a regenerator 160. The fluid catalytic cracking unit 120 contacts the hydrocarbon feed 102 with the FCC catalyst composition 124 to produce a used FCC catalyst and a cracked effluent. The regenerator 160 can process the used FCC catalyst to produce a regenerated FCC catalyst, which can be recycled back to the fluid catalytic cracking unit 120.

The hydrocarbon feed 102 can include one or more heavy oils, such as but not limited to crude oil, topped crude oil, vacuum residue, tar sands, bitumen, atmospheric residue, vacuum gas oils, other heavy oil streams, or combinations of these. It should be understood that, as used in this disclosure, a "heavy oil" refers to a raw hydrocarbon, such as crude oil, which has not been previously processed through distillation, a hydrocarbon that has undergone some degree of processing prior to being introduced to the FCC system 100 as the hydrocarbon feed 102, or a combination of both. The hydrocarbon feed 102 can have an end boiling point (EBP) of greater than or equal to 720° C. The hydrocarbon feed 102 can have an initial boiling point greater than 30° C. The hydrocarbon feed 102 can have an initial boiling point from 30° C. to 50° C. The hydrocarbon feed 102 can have a concentration of nitrogen of less than or equal to 900 parts per million by weight (ppmw).

In embodiments, the hydrocarbon feed 102 is crude oil. The crude oil can have an American Petroleum Institute (API) gravity of from 15 degrees to 50 degrees, such as from 20 degrees to 50 degrees, from 20 degrees to 40 degrees, from 20 degrees to 35 degrees, from 25 degrees to 50 degrees, from 25 degrees to 40 degrees, from 25 degrees to 35 degrees, from 30 degrees to 50 degrees, or from 30 degrees to 40 degrees. For example, the hydrocarbon feed 102 can be an Arab Light (AL) crude oil. The crude oil can have a density of greater than 0.8 grams per milliliter (g/mL), greater than 0.82 g/mL, greater than 0.84 g/mL, or even greater than 0.85 g/mL as measured at 15 degrees Celsius. In embodiments, the crude oil can have a density of less than or equal to 1.0 g/mL, less than or equal to 0.95 g/mL, less than or equal to 0.90 g/mL, or even less than or equal to 0.88 g/mL as measured at 15 degrees Celsius. In embodiments, the hydrocarbon feed 102 is Arab light crude oil. Properties for an exemplary grade of Arab light crude oil are provided in Table 1.

TABLE 1

| Analysis | Units | Value | Test Method |
| --- | --- | --- | --- |
| American Petroleum Institute (API) gravity | degree | 33.9 | ASTM D287 |
| Specific Gravity | — | 0.8555 | ASTM D1298 |
| Density | grams per milliliter (g/mL) | 0.8551 | ASTM D287 |
| Carbon Content | weight percent (wt. %) | 85.29 | ASTM D5291 |
| Hydrogen Content | wt. % | 12.68 | ASTM D5292 |
| Sulfur Content | wt. % | 1.94 | ASTM D5453 |
| Nitrogen Content | parts per million by weight (ppmw) | 830 | ASTM D4629 |
| Asphaltenes | wt. % | 1.2 | ASTM D6560 |
| Micro Carbon Residue (MCR) (Conradson Carbon) | wt. % | 4.25 | ASTM D4530 |
| Paraffins | wt. % | 13.0 | ASTM D5443 |
| Naphthenes | wt. % | 29.0 | ASTM D5443 |
| Aromatics | wt. % | 58.0 | ASTM D5443 |
| Sodium (Na) Content | ppmw | 0.9 | IP 501 |
| Vanadium (V) Content | ppmw | 10.2 | IP 501 |
| Nickel (Ni) Content | ppmw | 3.1 | IP 501 |
| Arsenic (As) Content | ppmw | 0.04 | IP 501 |
| Boiling Point Distribution | | | |
| Initial Boiling Point (IBP) | Degrees Celsius (° C.) | 33 | ASTM D7169 |
| 5% Boiling Point (BP) | ° C. | 92 | ASTM D7169 |
| 10% BP | ° C. | 133 | ASTM D7169 |
| 20% BP | ° C. | 192 | ASTM D7169 |
| 30% BP | ° C. | 251 | ASTM D7169 |
| 40% BP | ° C. | 310 | ASTM D7169 |
| 50% BP | ° C. | 369 | ASTM D7169 |
| 60% BP | ° C. | 432 | ASTM D7169 |
| 70% BP | ° C. | 503 | ASTM D7169 |
| 80% BP | ° C. | 592 | ASTM D7169 |
| 90% BP | ° C. | >720 | ASTM D7169 |
| 95% BP | ° C. | >720 | ASTM D7169 |
| End Boiling Point (EBP) | ° C. | >720 | ASTM D7169 |
| BP range C5-180° C. | wt. % | 18.0 | ASTM D7169 |
| BP range 180° C.-350° C. | wt. % | 28.8 | ASTM D7169 |
| BP range 350° C.-540° C. | wt. % | 27.4 | ASTM D7169 |
| BP range >540° C. | wt. % | 25.8 | ASTM D7169 |

Weight percentages in Table 1 are based on the total weight of the crude oil.

When the hydrocarbon feed 102 comprises, consists of, or consists essentially of a crude oil, the crude oil can be a whole crude or a crude oil that has undergone at least some processing, such as desalting, solids separation, scrubbing, or combinations of these, but has not been subjected to distillation. For instance, the hydrocarbon feed 102 can be a de-salted crude oil that has been subjected to a de-salting process. In embodiments, the hydrocarbon feed 102 can include a crude oil that has not undergone pretreatment, separation (such as distillation), or other operation that changes the hydrocarbon composition of the crude oil prior to introducing the crude oil to the FCC system 100. As used herein, the "hydrocarbon composition" of the crude oil refers to the composition of the hydrocarbon constituents of the crude oil and does not include entrained non-hydrocarbon solids, salts, water, or other non-hydrocarbon constituents.

In embodiments, the hydrocarbon feed 102 can be a crude oil having an initial boiling point temperature of greater than or equal to 30° C., such as from 30° C. to 50° C., or from 30° C. to 40° C., as determined according to standard test method ASTM D7169. In embodiments, the hydrocarbon feed 102 can be a crude oil having an end boiling point temperature greater than 720° C., as determined according to standard test method ASTM D7169. In embodiments, the hydrocarbon feed 102 can be a crude oil having a 50% boiling point temperature greater than 300° C., such as from 300° C. to 400° C., from 300° C. to 380° C., from 300° C. to 375° C., from 350° C. to 400° C., from 350° C. to 380° C., from 350° C. to 375° C., from 360° C. to 400° C., from 360° C. to 380° C., or even from 360° C. to 375° C., as determined according to standard test method ASTM D7169.

In embodiments, the hydrocarbon feed 102 can have a concentration of paraffin compounds of less than 50 wt. %, such as less than or equal to 40 wt. %, less than or equal to 35 wt. %, less than or equal to 30 wt. %, less than or equal to 25 wt. %, or even less than or equal to 20 wt. % per unit weight of the hydrocarbon feed, as determined according to ASTM 5443. In embodiments, the hydrocarbon feed 102 can have a concentration of paraffin compounds of from 5 wt. % to less than 50 wt. %, from 5 wt. % to 40 wt. %, from 5 wt. % to 35 wt. %, from 5 wt. % to 30 wt. %, from 5 wt. % to 25 wt. %, from 5 wt. % to 20 wt. %, from 10 wt. % to less than 50 wt. %, from 10 wt. % to 40 wt. %, from 10 wt. % to 35 wt. %, from 10 wt. % to 30 wt. %, from 10 wt. % to 25 wt. %, or even from 10 wt. % to 20 wt. % per unit weight of the hydrocarbon feed 102.

In embodiments, the hydrocarbon feed 102 can have a concentration of aromatic compounds of greater than or equal to 20 wt. %, greater than or equal to 30 wt. %, greater than or equal to 40 wt. %, or even greater than or equal to 50 wt. % per unit weight of the hydrocarbon feed 102, as determined according to ASTM 5443. In embodiments, the hydrocarbon feed 102 can have a concentration of aromatic compounds of from 20 wt. % to 90 wt. %, from 20 wt. % to 80 wt. %, from 20 wt. % to 70 wt. %, from 30 wt. % to 90 wt. %, from 30 wt. % to 80 wt. %, from 30 wt. % to 70 wt. %, from 40 wt. % to 90 wt. %, from 40 wt. % to 80 wt. %, from 40 wt. % to 70 wt. %, from 50 wt. % to 90 wt. %, from 50 wt. % to 80 wt. %, or even from 50 wt. % to 70 wt. % per unit weight of the hydrocarbon feed 102.

In embodiments, the hydrocarbon feed 102 can have a concentration of naphthenes of greater than or equal to 25 wt. %, or even greater than or equal to 27 wt. % per unit weight of the hydrocarbon feed 102, as determined according to ASTM 5443. In embodiments, the hydrocarbon feed 102 can have a concentration of naphthenes of from 25 wt. % to 60 wt. %, from 25 wt. % to 50 wt. %, from 25 wt. % to 40 wt. %, from 25 wt. % to 35 wt. %, from 27 wt. % to 60 wt. %, from 27 wt. % to 50 wt. %, from 27 wt. % to 40 wt. %, or even from 27 wt. % to 35 wt. % per unit weight of the hydrocarbon feed 102.

In embodiments, the hydrocarbon feed 102 can be a topped crude oil. As used in the present disclosure, the term "topped crude oil" refers to crude oil from which lesser boiling constituents have been removed through distillation, such as constituents having boiling point temperatures less than 180° C. or even less than 160° C. In embodiments, the hydrocarbon feed 102 comprises, consists of, or consists essentially of a topped crude oil, which has greater than or equal to 95%, greater than or equal to 98%, or even greater than or equal to 99% constituents having boiling point temperatures greater than or equal to 160° C. or greater than or equal to 180° C., depending on the cut point temperature of the topping unit.

While the present disclosure may specify the hydrocarbon feed 102 as a crude oil or a topped crude oil, it should be understood that the FCC system 100 of the present disclosure may be additionally applicable for the conversion of a wider variety of heavy hydrocarbon-containing feeds, such as, but not limited to, crude oil, vacuum residue, tar sands, bitumen, atmospheric residue, vacuum gas oils, demetallized oils, naphtha streams, or combinations of these. The hydrocarbon feed 102 can further include one or more non-hydrocarbon constituents, such as heavy metals, sulfur compounds, nitrogen compounds, inorganic components, or combinations of these.

In embodiments, one or more supplemental feeds (not depicted) can be mixed with the hydrocarbon feed 102 prior to introducing the hydrocarbon feed 102 to the fluid catalytic cracking unit 120 or introduced independently to the fluid catalytic cracking unit 120 in addition to the hydrocarbon feed 102. In embodiments, the hydrocarbon feed 102 can be a crude oil, such as an Arab light crude oil, and one or more supplemental streams, such as vacuum residue, atmospheric residue, vacuum gas oils, demetallized oils, naphtha streams, or combinations of these, can be mixed with the hydrocarbon feed 102 upstream of the fluid catalytic cracking unit 120 or introduced independently to the fluid catalytic cracking unit 120.

The processes of the present disclosure include passing the hydrocarbon feed 102 to an FCC system 100 comprising the FCC catalyst composition 124. The FCC catalyst composition 124 of the present disclosure includes a ZSM-5 zeolite and a Y-type zeolite. The FCC catalyst composition can also include an alumina binder, a matrix material comprising Kaolin clay, and colloidal silica.

The ZSM-5 zeolite in the FCC catalyst composition 124 may be operable to crack at least a portion of the hydrocarbon feed, to produce one or more light olefins, such as ethylene and propylene. Without being bound by any particular theory, it is believed that the ZSM-5 zeolite may have a greater propensity to crack the relatively lighter hydrocarbons, such as those present in the hydrocarbon feed 102 and those produced by the catalytic cracking of heavier hydrocarbons by the Y-type zeolite. As a result, the inclusion of the ZSM-5 zeolite may increase the yield of products, such as light olefins, when compared to FCC catalysts that do not include the ZSM-5 zeolite. As used in the present disclosure, "ZSM-5" refers to zeolites having an MFI framework type according to the IUPAC zeolite nomenclature and consisting of silica and alumina. ZSM-5 refers to "Zeolite Socony Mobil-5" and is a pentasil family zeolite that can be represented by the chemical formula $Na_nAl_nSi_{96-n}O_{192} \cdot 16H_2O$, where $0<n<27$. The molar ratio of silica to alumina in the ZSM-5 may be at least 5, at least 10, at least 25, at least 30 or even at least 50. In embodiments, the molar ratio of silica to alumina in the ZSM-5 may be from 5 to 50, from 5 to 40, from 5 to 35, from 10 to 50, from 10 to 40, from 10 to 35, from 20 to 50, from 20 to 40, from 20 to 35, from 30 to 50, or from 30 to 40.

In embodiments, the ZSM-5 zeolite may have an average surface area from 200 meters squared per gram ($m^2/g$) to 800 $m^2/g$. In embodiments, the average surface area may be from 200 $m^2/g$ to 400 $m^2/g$, from 200 $m^2/g$ to 600 $m^2/g$, from 200 $m^2/g$ to 800 $m^2/g$, from 300 $m^2/g$ to 400 $m^2/g$, from 300 $m^2/g$ to 600 $m^2/g$, from 300 $m^2/g$ to 800 $m^2/g$, from 400 $m^2/g$ to 600 $m^2/g$, or from 400 $m^2/g$ to 800 $m^2/g$. In embodiments, the ZSM-5 zeolite, can have an average total pore volume per unit weight of the ZSM-5 zeolite of from 0.010 milliliters per gram (mL/g) to 0.500 mL/g, such as from 0.050 mL/g to 0.500 mL/g, from 0.010 mL/g to 0.300 mL/g, or from 0.050 mL/g to 0.300 mL/g.

In embodiments, one or more of the zeolitic components of the FCC catalyst composition 124 can include one or more phosphorous-containing compounds, such as phosphorous pentoxide ($P_2O_5$). Without being bound by any particular theory, it is believed that phosphorus-containing compounds may stabilize the structure of the zeolitic framework structure by preventing the segregation of the framework alumina, which can improve the hydrothermal stability of the zeolitic component. This may reduce the dealumination of the zeolitic component that occurs during steaming, which can lead to a reduction in acidity and catalytic activity of the zeolitic component. In embodiments, one or more of the zeolitic components of the FCC catalyst composition 124 may include one or more phosphorous-containing compounds in an amount of from 1 wt. % to 20 wt. % based on the total weight of each zeolitic component. In embodiments, the phosphorous-containing compounds can be impregnated onto the ZSM-5 zeolite so that the ZSM-5 zeolite is impregnated with from 1 wt. % to 20 wt. % phosphorous-containing compounds based on the total weight of the ZSM-5 zeolite. In embodiments, the ZSM-5 zeolite can be impregnated with from 1 wt. % to 20 wt. % phosphorous pentoxide based on the total weight of the ZSM-5 zeolite. In embodiments, the ZSM-5 zeolite can include from 1 wt. % to 15 wt. %, from 1 wt. % to 10 wt. %, from 1 wt. % to 5 wt. %, from 5 wt. % to 20 wt. %, from 5 wt. % to 15 wt. %, from 5 wt. % to 10 wt. %, from 10 wt. % to 20 wt. %, from 10 wt. % to 15 wt. %, from 15 wt. % to 20 wt. %, from 6 wt. % to 9 wt. %, or from 7 wt. % to 8 wt. % phosphorous pentoxide based on the total weight of the ZSM-5 zeolite. In embodiments, the ZSM-5 zeolite can include about 7.5 wt. % phosphorous pentoxide based on the total weight of the ZSM-5 zeolite.

In embodiments, the FCC catalyst composition 124 can include up to 40 wt. % ZSM-5 zeolite based on the total weight the FCC catalyst composition 124. In embodiments, the FCC catalyst composition 124 can include up to 30 wt. %, up to 25 wt. %, or up to 20 wt. % ZSM-5 zeolite based on the total weight of the FCC catalyst composition 124. In embodiments, the FCC catalyst composition 124 can include from 1 wt. % to 40 wt. %, from 1 wt. % to 30 wt. %, from 1 wt. % to 25 wt. %, from 1 wt. % to 20 wt. %, 5 wt. % to 40 wt. %, from 5 wt. % to 30 wt. %, from 5 wt. % to 25 wt. %, from 5 wt. % to 20 wt. %, 10 wt. % to 40 wt. %, from 10 wt. % to 30 wt. %, from 10 wt. % to 25 wt. %, from 10 wt. % to 20 wt. %, from 15 wt. % to 40 wt. %, from 15 wt. % to 30 wt. %, from 15 wt. % to 25 wt. %, or from 15 wt. % to 20 wt. % of the ZSM-5 zeolite based on the total weight of the FCC catalyst composition 124.

The Y-type zeolite of the FCC catalyst composition 124 can operate to produce one or more olefins from the hydrocarbons in the hydrocarbon feed 102. In embodiments, the Y-type zeolite can comprise an ultrastable Y-type (USY) zeolite. USY zeolites can be produced via the dealumination of one or more Y-type zeolites. As used in the present disclosure, the term "Y-type zeolite" refers to a zeolite having an FAU framework type according to the IUPAC zeolite nomenclature and consisting of silica and alumina. Without being bound by any particular theory, it is believed that the dealumination of the Y-type zeolite may result in a USY zeolite having a reduced number of acid sites. This reduced number of acid sites may result in a reduction of the rates of secondary reactions in the FCC system 100, such as the dehydrogenation or hydrogenation of olefins produced in the FCC system 100, when compared to Y-type zeolite that has not been dealuminated. As a result, USY zeolite may produce a greater yield of olefins when compared to Y-type zeolite.

The molar ratio of silica to alumina in the USY zeolite can be greater than or equal to 5, greater than or equal to 10, greater than or equal to 25, or even greater than or equal to 50. In embodiments, the molar ratio of silica to alumina in the USY zeolite can be from 5 to 50, from 5 to 25, from 5 to 10, from 10 to 50, from 10 to 25, or from 25 to 50. In embodiments, the molar ratio of silica to alumina in the USY zeolite can be about 30. In embodiments, the USY zeolite can also comprise one or more transition metals, such as zirconium, titanium, or hafnium, substituted into the framework of the zeolite. The USY zeolite can have an average surface area of from 200 m$^2$/g to 900 m$^2$/g. In embodiments, the USY zeolite may have an average surface area of from 200 m$^2$/g to 800 m$^2$/g, from 300 m$^2$/g to 900 m$^2$/g, from 300 m$^2$/g to 800 m$^2$/g, from 500 m$^2$/g to 900 m$^2$/g, or from 500 m$^2$/g to 800 m$^2$/g. The USY zeolite may have an average total pore volume per unit weight of the USY zeolite of from 0.050 mL/g to 0.600 mL/g, such as from 0.050 mL/g to 0.500 mL/g.

In embodiments, one or more of the zeolitic components of the FCC catalyst composition 124 can include one or more rare earth metals or rare earth metal oxides, where the rare earth metal can be one or more of lanthanum, cerium, dysprosium, europium, gadolinium, holmium, lutetium, neodymium, praseodymium, promethium, samarium, scandium, terbium, thulium, ytterbium, yttrium, or combinations of these. Without being bound by any particular theory, it is believed that rare earth metals or metal oxides can improve the stability of the unit cells of the zeolitic component, increase the catalytic activity of the zeolitic component, or both. Moreover, it is believed that rare earth metals or metal oxides can function as vanadium traps, which act to sequester vanadium in the feed and prevent deleterious effects that vanadium can have on the zeolitic components of the catalyst. In embodiments, one or more of the zeolitic components of the FCC catalyst composition 124 can include one or more rare earth metals in an amount of from 1 wt. % to 5 wt. % based on the total weight of each zeolitic component. In embodiments, one or more of the zeolitic components of the FCC catalyst composition 124 can be impregnated with lanthanum or lanthanum oxide. In embodiments, one or more of the zeolitic components of the FCC catalyst composition 124 can include one or more lanthanum-containing compounds, such as but not limited to lanthanum oxide, in an amount of from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % based on the total weight of each zeolitic component.

In embodiments, the rare earth or rare earth oxide can be impregnated on the USY zeolite of the FCC catalyst composition 124. In embodiments, the FCC catalyst composition 124 can comprise USY zeolite impregnated with lanthanum oxide (La$_2$O$_3$). In embodiments, the USY zeolite can include from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % lanthanum oxide based on the total weight of the USY zeolite. In embodiments, the USY zeolite can comprise about 2.5 wt. % lanthanum oxide based on the total weight of the USY zeolite.

In embodiments, the FCC catalyst composition 124 can include up to 40 wt. % USY zeolite based on the total weight the FCC catalyst composition 124. In embodiments, the FCC catalyst composition 124 can include up to 30 wt. %, or up to 25 wt. % USY zeolite based on the total weight of the FCC catalyst composition 124. In embodiments, the FCC catalyst composition 124 can include from 1 wt. % to 40 wt. %, from 1 wt. % to 30 wt. %, from 1 wt. % to 25 wt. %, from 5 wt. % to 40 wt. %, from 5 wt. % to 30 wt. %, from 5 wt. % to 25 wt. %, from 10 wt. % to 40 wt. %, from 10 wt. % to 30 wt. %, from 10 wt. % to 25 wt. %, from 15 wt. % to 40 wt. %, from 15 wt. % to 30 wt. %, or from 15 wt. % to 25 wt. % USY zeolite based on the total weight of the FCC catalyst composition 124.

In embodiments, the FCC catalyst composition 124 can include one or more binder materials, such as alumina-containing compounds or silica-containing compounds (including compounds containing alumina and silica). As used in the present disclosure, "binder materials" refer to materials that serve to "glue" or otherwise hold components of the FCC catalyst composition 124. Binder materials can be included to improve the attrition resistance of the FCC catalyst composition 124. The binders can comprise alumina (such as amorphous alumina), silica-alumina (such as amorphous silica-alumina), or silica (such as amorphous silica). According to one or more embodiments, the binder material can comprise pseudoboehmite. As used in the present disclosure, "pseudoboehmite" refers to an aluminum-containing compound with the chemical composition AlO(OH) consisting of crystalline boehmite. While boehmite generally refers to aluminum oxide hydroxide as well, pseudoboehmite generally has a greater amount of water than boehmite. In embodiments, the binder material can comprise amorphous silica. The amorphous silica can be in the form of colloidal silica. As used throughout the present disclosure, the term "colloidal silica" refers to nano-sized particles of amorphous, non-porous silica. In embodiments, the FCC catalyst composition 124 can comprise an alumina binder, colloidal silica, or both.

In embodiments, the FCC catalyst composition 124 can include the one or more binders in an amount of from 5 wt. % to 30 wt. % based on the total weight of the FCC catalyst composition 124. In embodiments, the FCC catalyst composition 124 can include the one or more binders in an amount of from 5 wt. % to 25 wt. %, from 5 wt. % to 20 wt. %, from 5 wt. % to 15 wt. %, from 5 wt. % to 10 wt. %, from 10 wt. % to 25 wt. %, from 10 wt. % to 20 wt. %, from 10 wt. % to 15 wt. %, from 15 wt. % to 30 wt. %, from 15 wt. % to 25 wt. %, from 15 wt. % to 20 wt. %, from 20 wt. % to 30 wt. %, from 20 wt. % to 25 wt. %, or from 25 wt. % to 30 wt. % based on the total weight of the FCC catalyst composition 124.

In embodiments, the FCC catalyst composition 124 can include an alumina binder in an amount of from 2 wt. % to 20 wt. % based on the total weight of the FCC catalyst composition 124. In embodiments, the FCC catalyst composition 124 can include the alumina binder in an amount of from 2 wt. % to 15 wt. %, from 2 wt. % to 10 wt. %, from 5 wt. % to 20 wt. %, from 5 wt. % to 15 wt. %, from 5 wt. % to 10 wt. %, or from 7 wt. % to 9 wt. % based on the total weight of the FCC catalyst composition 124. In embodiments the FCC catalyst composition 124 can include about 8 wt. % alumina binder based on the total weight of the FCC catalyst composition 124.

In embodiments, the FCC catalyst composition 124 can include colloidal silica in an amount of from 0.5 wt. % to 5 wt. % based on the total weight of the FCC catalyst composition 124. In embodiments, the FCC catalyst composition 124 can include colloidal silica in an amount of from 0.5 wt. % to 4 wt. %, from 0.5 wt. % to 3 wt. %, from 0.5 wt. % to 2 wt. %, from 1 wt. % to 4 wt. %, from 1 wt. % to 3 wt. %, from 1 wt. % to 2 wt. %, from 2 wt. % to 4 wt. %, or from 2 wt. % to 3 wt. % based on the total weight of the FCC catalyst composition 124. In embodiments the FCC catalyst composition 124 can include about 2 wt. % colloidal silica based on the total weight of the FCC catalyst composition 124. Without intending to be bound by any particular theory, it is believed that the colloidal silica can act as a binder and/or filler to provide additional physical strength and integrity to the FCC catalyst. Further, it is believed that the addition of colloidal silica to the FCC catalyst can improve the attrition resistance and/or stabilize catalytic activity of the FCC catalyst.

In embodiments, the FCC catalyst composition 124 may include one or more matrix materials, which may include one or more clay materials, such as but not limited to Kaolin clay. Without being bound by any particular theory, it is believed that the matrix materials of the FCC catalyst composition 124 can serve both physical and catalytic functions. Physical functions can include providing particle integrity and attrition resistance, acting as a heat transfer medium, and providing a porous structure to allow diffusion of hydrocarbons into and out of the catalyst microspheres. The matrix materials can also affect catalyst selectivity, product quality, and resistance to poisons. The matrix materials may tend to exert its strongest influence on overall catalytic properties for those reactions that directly involve relatively large molecules.

In embodiments, the matrix materials can include Kaolin clay. As used in the present disclosure, "Kaolin clay" refers to a clay material that has a relatively large amount (such as at least about 50 wt. %, at least 60 wt. %, at least 70 wt. %, at least 80 wt. %, at least 90 wt. %, or at least 95 wt. %) of kaolinite, which can be represented by the chemical formula $Al_2Si_2O_5(OH)_4$. In embodiments, the FCC catalyst composition 124 can include one or more matrix materials in an amount of from 30 wt. % to 60 wt. % based on the total weight of each of the FCC catalyst composition 124. In embodiments, the FCC catalyst composition 124 can include from 30 wt. % to 55 wt. %, from 30 wt. % to 50 wt. %, from 30 wt. % to 45 wt. %, from 30 wt. % to 40 wt. %, from 30 wt. % to 35 wt. %, from 35 wt. % to 60 wt. %, from 35 wt. % to 55 wt. %, from 35 wt. % to 50 wt. %, from 35 wt. % to 45 wt. %, from 35 wt. % to 40 wt. %, from 40 wt. % to 60 wt. %, from 40 wt. % to 55 wt. %, from 40 wt. % to 50 wt. %, from 40 wt. % to 45 wt. %, from 45 wt. % to 60 wt. %, from 45 wt. % to 55 wt. %, from 45 wt. % to 50 wt. %, from 50 wt. % to 60 wt. %, from 50 wt. % to 55 wt. %, or from 55 wt. % to 60 wt. % matrix materials based on the total weight of the FCC catalyst composition 124.

In embodiments, the FCC catalyst composition 124 can include ZSM-5 zeolite impregnated with phosphorous, a USY zeolite impregnated with lanthanum oxide, an alumina binder, a matrix material comprising Kaolin clay, and colloidal silica. In embodiments, the ZSM-5 zeolite can be impregnated with 7.5 wt. % phosphorous pentoxide based on the total weight of the ZSM-5 zeolite. In embodiments the USY zeolite can be impregnated with 2.5 wt. % lanthanum oxide, based on the total weight of the USY zeolite.

In embodiments, the FCC catalyst composition 124 can comprise 20 wt. % ZSM-5 zeolite based on the total weight of the FCC catalyst composition 124, where the ZSM-5 zeolite is impregnated with 7.5 wt. % $P_2O_5$ based on the total weight of the ZSM-5 zeolite; 21 wt. % USY zeolite based on the total weight of the FCC catalyst composition 124, where the USY zeolite is impregnated with 2.5 wt. % lanthanum oxide ($La_2O_3$) based on the total weight of the USY zeolite; 8 wt. % alumina binder based on the total weight of the FCC catalyst composition 124; 49 wt. % Kaolin clay based on the total weight of the FCC catalyst composition 124; and 2 wt. % colloidal silica based on the total weight of the FCC catalyst composition 124. In embodiments, the FCC catalyst composition 124 can comprise a plurality of catalyst particles, where each of the plurality of catalyst particles comprises the ZSM-5 zeolite impregnated with phosphorous pentoxide, the USY zeolite impregnated with lanthanum oxide, the alumina binder, the Kaolin clay, and the colloidal silica.

The FCC catalyst composition 124 can be formed by a variety of processes. According to one embodiment, the matrix material can be mixed with a fluid such as water to form a slurry, and the zeolites can be separately mixed with a fluid such as water to form a slurry. The matrix material slurry and the zeolite slurry can be combined under stirring. Separately, another slurry can be formed by combining the binder material with a fluid such as water. The binder slurry can then be combined with the slurry containing the zeolites and matrix material to form a final slurry. The final slurry can then be dried, for example by spraying, and then calcined to produce the microparticles of the cracking catalyst.

In embodiments, the FCC catalyst composition 124 can be in the form of shaped microparticles, such as microspheres. As used in the present disclosure, "microparticles" refer to particles having an average particle size of from 0.1 microns and 100 microns. The size of a microparticle refers to the maximum length of a particle from one side to another, measured along the longest distance of the microparticle. For instance, a spherically shaped microparticle has a size equal to its diameter, or a rectangular prism shaped microparticle has a maximum length equal to the hypotenuse stretching from opposite corners. In embodiments, each zeolitic component of the FCC catalyst composition 124 can be included in each catalyst microparticle. However, in other embodiments, microparticles can be mixed, where the microparticles contain only a portion of the FCC catalyst composition 124. For instance, a mixture of two microparticle types may be included in the FCC catalyst composition 124, where one type of microparticle includes only ZSM-5, and another type of microparticle includes only the USY zeolite.

The FCC catalyst composition 124 can be contacted with steam prior to use in the FCC system 100. The purpose of steam treatment can be to accelerate the hydrothermal aging of the FCC catalyst composition 124 that occurs during operation of the FCC system 100 to obtain an equilibrium catalyst. Not intending to be bound by any particular theory, it is believed that the steam treatment can lead to the removal of aluminum from the framework leading to a decrease in the number of sites where framework hydrolysis can occur under hydrothermal and thermal conditions. This removal of aluminum results in an increased thermal and hydrothermal stability in dealuminated zeolites. The unit cell size can decrease as a result of dealumination, since the smaller $SiO_4$ tetrahedron replaces the larger $AlO_4^-$ tetrahedron. The acidity of zeolites can also be affected by dealumination through the removal of framework aluminum and the formation of extra-framework aluminum species. Dealumination may affect the acidity of the zeolites by decreasing the total acidity and increasing the acid strength of the zeolite. The total acidity can decrease because of the removal of framework aluminum, which act as Brønsted acid sites. The acid strength of the zeolite may be increased because of the removal of paired acid sites or the removal of the second coordinate next nearest neighbor aluminum. The increase in the acid strength may be caused by the charge density on the proton of the OH group being highest when there is no framework aluminum in the second coordination sphere. In embodiments, the FCC catalyst composition 124 can be contacted with steam at a temperature greater than or equal to 800° C. for a period of 6 hours or greater prior to contacting the hydrocarbon feed 102 with the FCC catalyst composition 124 in the FCC system 100.

Referring again to FIG. 1, the FCC system 100 includes the fluid catalytic cracking unit 120 and the regenerator 160. In embodiments, the FCC system 100 can include a plurality of fluid catalytic cracking units 120, which can be operated in series, in parallel, or a combination of both. The fluid catalytic cracking unit 120 can include a catalyst-feed mixing zone 128, a cracking reaction zone 122, a catalyst separation zone 130, and a stripping zone 132. In embodiments, the cracking reaction zone 122 can be a downflow or "downer" reactor in which the reactants flow from the catalyst-feed mixing zone 128 downward through the cracking reaction zone 122 to the separation zone 130. Steam 127 can be introduced to the top portion of the cracking reaction zone 122 to provide additional heating to the mixture of the hydrocarbon feed 102 and the FCC catalyst composition 124.

It should be understood that the cracking reaction zone 122 of the fluid catalytic cracking unit 120 depicted in FIG. 1 is a simplified schematic of one particular embodiment of the cracking reaction zone 122 of a fluid catalytic cracking unit, and other configurations of the cracking reaction zone 122 may be suitable for incorporation into the FCC system 100. In embodiments, the cracking reaction zone 122 can be an up-flow cracking reaction zone. In embodiments, the cracking reaction zone 122 can include one or more riser reactors. Other embodiments may include two or more fluid catalytic cracking units operating in parallel under similar or different operating conditions.

Referring again to FIG. 1, the fluid catalytic cracking unit 120 is fluidly coupled to the regenerator 160. In embodiments, the regenerator 160 can be a single-zone regenerator that includes a regeneration zone 162. The used FCC catalyst 125 can be regenerated in the regeneration zone 162 to produce a regenerated FCC catalyst 123. In other embodiments, the regenerator 160 can be a dual-zone regenerator that includes two separate regeneration zones (not pictured). Referring again to FIG. 1, the regenerator 160 can include a riser 166. The riser 166 can be positioned between the stripping zone 132 and the regeneration zone 162. The used FCC catalyst 125 is regenerated to produce the regenerated FCC catalyst 123. The regenerated FCC catalyst 123 is then passed back to the catalyst-feed mixing zone 128 as the FCC catalyst composition 124.

The FCC system 100 can include a catalyst hopper 174 disposed between the regeneration zone 162 of the regenerator 160 and the fluid catalytic cracking unit 120. The regenerated FCC catalyst 123 can be passed from the regeneration zone 162 to the catalyst hopper 174, where the regenerated FCC catalyst 123 can accumulate prior to passing from the catalyst hopper 174 to the catalyst-feed mixing zone 128 as the FCC catalyst composition 124. The regenerated FCC catalyst 123, which may be at an elevated temperature equal to or greater than the reaction temperature in the cracking reaction zone 122, can provide heat for the endothermic cracking reaction in the cracking reaction zone 122.

The hydrocarbon feed 102 can be introduced to the catalyst-feed mixing zone 128, where the hydrocarbon feed 102 can be mixed with the FCC catalyst composition 124. The mixture comprising the hydrocarbon feed 102 and the FCC catalyst composition 124 can be introduced to the cracking reaction zone 122. When the cracking reaction zone 122 is a downflow reactor, the mixture of the hydrocarbon feed 102 and the FCC catalyst composition 124 can be introduced to a top portion of the cracking reaction zone 122. When the cracking reaction zone 122 is an upflow reactor, the mixture of the hydrocarbon feed 102 and the FCC catalyst composition 124 can be introduced to a bottom of a riser portion of the cracking reaction zone 122, and may be combined with a carrier gas (not shown).

In embodiments, one or more supplemental feed streams (not shown) can be combined with the hydrocarbon feed 102 before introduction of the hydrocarbon feed 102 to the catalyst-feed mixing zone 128. In other embodiments, one or more supplemental feed streams can be added directly to the catalyst-feed mixing zone 128, where the supplemental feed stream is mixed with the hydrocarbon feed 102 and the FCC catalyst composition 124 prior to introduction into the cracking reaction zone 122. As previously described, the supplemental feed stream may include one or more of vacuum residues, tar sands, bitumen, atmospheric residues, vacuum gas oils, demetallized oils, naphtha streams, or combinations of these.

During steady state operation of the FCC system 100, the FCC catalyst composition 124 can be the regenerated FCC catalyst 123 that is passed to the catalyst-feed mixing zone 128 from the catalyst hopper 174. The catalyst hopper 174 can receive the regenerated FCC catalyst 123 from the regenerator 160 following regeneration of the used FCC catalyst 125. At initial start-up of the FCC system 100, the FCC catalyst composition 124 can include fresh FCC catalyst (not shown), which may be the FCC catalyst composition 124 microparticles that have not been circulated through the fluid catalytic cracking unit 120 and the regenerator 160. In embodiments, fresh FCC catalyst can also be introduced to the catalyst hopper 174 during steady-state operation of the FCC system 100 so that the FCC catalyst composition 124 introduced to the catalyst-feed mixing zone 128 comprises a mixture of fresh FCC catalyst and regenerated FCC catalyst 123. Fresh FCC catalyst composition 124 can be introduced to the catalyst hopper 174 periodically during operation to replenish lost FCC catalyst composition 124 microparticles or compensate for used FCC catalyst 125 that becomes permanently deactivated, such as through heavy metal accumulation in the catalyst.

Hydrocarbons from the hydrocarbon feed 102 are contacted with the FCC catalyst composition 124 in the cracking reaction zone 122, which causes at least a portion of the hydrocarbons from the hydrocarbon feed 102 to undergo one or more catalytic cracking reactions to form one or more cracking reaction products, which can include one or more olefins. The FCC catalyst composition 124 can have a temperature equal to or greater than the reaction temperature of the cracking reaction zone 122 and can transfer heat to the hydrocarbon feed 102 to promote the endothermic cracking reaction. Steam 127 can be added to the cracking reaction zone 122 to further increase the temperature in the cracking reaction zone 122, increase the surface area of the hydrocarbon feed 102 by atomizing the hydrocarbon feed 102 into smaller droplets, or reduce the hydrocarbon partial pressure, all of which can improve production of light olefins compared to not injecting steam into the cracking reaction zone 122.

In embodiments, the fluid catalytic cracking unit 120 can be operated under high-severity reaction conditions. In embodiments, the cracking reaction zone 122 can be operated at a reaction temperature of from 580° C. to 750° C. In embodiments, the reaction temperature of the cracking reaction zone 122 can be from 580° C. to 740° C., from 580° C. to 720° C., from 580° C. to 700° C., from 580° C. to 680° C., from 580° C. to 660° C., from 580° C. to 650° C., from 600° C. to 750° C., from 600° C. to 740° C., from 600° C. to 720° C., from 600° C. to 700° C., from 600° C. to 680° C., from 600° C. to 660° C., from 600° C. to 650° C., from 620° C. to 750° C., from 620° C. to 740° C., from 620° C. to 720° C., from 620° C. to 700° C., from 620° C. to 680° C., from 620° C. to 660° C., or from 620° C. to 650° C. When the reaction temperature of the cracking reaction zone 122 is greater than, for instance, 750° C., the hydrocarbon feed 102 may undergo increased thermal cracking and decreased catalytic cracking compared to embodiments where the reaction temperature of the cracking reaction zone 122 is less than 750° C. Thermal cracking of the hydrocarbon feed 102 can increase yield of ethylene and decrease yield of other products. In embodiments, the hydrocarbon feed 102 can be contacted with the FCC catalyst composition 124 in the catalytic cracking unit 120 at a temperature of from 600° C. to 650° C. Catalytic cracking of the hydrocarbon feed 102 in the fluid catalytic cracking unit 120 can yield a greater number of desired products, such as light olefins and aromatics.

In embodiments, the fluid catalytic cracking unit 120 can be operated with a catalyst-to-oil weight (CTO) ratio from 2:1 to 10:1, where the catalyst-to-oil weight ratio is the weight ratio of the FCC catalyst composition 124 to the weight of the hydrocarbon feed 102 in a unit volume of the reaction mixture comprising the hydrocarbon feed 102 and the FCC catalyst composition 124. In embodiments, the fluid catalytic cracking unit 120 can be operated with a catalyst-to-oil weight ratio from 2:1 to 3:1, from 2:1 to 5:1, from 2:1 to 10:1, from 3:1 to 5:1, or from 5:1 to 10:1. Without intending to be bound by any particular theory, it is believed that a catalyst-to-oil weight ratio less than 2:1 may not provide a sufficient amount of catalyst present to catalytically crack the hydrocarbon feed 102 at an economically high yield. It is believed that a catalyst-to-oil weight ratio greater than 10:1 may not be economically practical for scaling up in commercial applications.

In embodiments, the fluid catalytic cracking unit 120 can be operated with a residence time from 0.1 seconds to 60 seconds. In embodiments, the fluid catalytic cracking unit 120 may be operated with a residence time from 0.1 seconds to 30 seconds, from 0.1 seconds to 60 seconds, from 20 seconds to 40 seconds, or from 30 seconds to 60 seconds. Without intending to be bound by any particular theory, it is believed that a residence time less than 0.1 seconds may not provide sufficient time for hydrocarbons in the hydrocarbon feed 102 to be sufficiently cracked by the FCC catalyst composition 124.

Catalytically cracking the hydrocarbon feed 102 through contact with the FCC catalyst composition 124 produces a mixture of the used FCC catalyst 125 and a cracked effluent 126. The used FCC catalyst 125 may be separated from the cracked effluent 126 and passed to the regeneration zone 162 of the regenerator 160, in which the used FCC catalyst 125 is regenerated to produce the regenerated FCC catalyst 123. The regenerated FCC catalyst 123 is then passed back to the cracking reaction zone 122 as the FCC catalyst composition 124.

Following the cracking reaction in the cracking reaction zone 122, the contents of the cracking reaction zone 122 include the used FCC catalyst 125 and the cracked effluent 126, which may then be passed to the separation zone 130. In the separation zone 130, the used FCC catalyst 125 can be separated from at least a portion of the cracked effluent 126. In embodiments, the separation zone 130 can include one or more gas solid separators, such as one or more cyclones. The used FCC catalyst 125 exiting from the separation zone 130 can retain at least a portion of the cracked effluent 126, such as cracked effluent 126 retained in the pores of the used FCC catalyst 125, between microparticles of the used FCC catalyst 125, or both.

Following separation from the cracked effluent 126 in the separation zone 130, the used FCC catalyst 125, which may include at least a portion of the cracked effluent 126 retained in the used FCC catalyst 125, can be passed to the stripping zone 132, where the additional portions of the cracked effluent 126 are stripped from the used FCC catalyst 125 and recovered as a stripped effluent 134. The stripped effluent 134 can be passed to one or more downstream unit operations or combined with the cracked effluent 126 for further processing. Steam 133 may be introduced to the stripping zone 132 to facilitate stripping the retained portions of the cracked effluent 126 from the used FCC catalyst 125. The stripped effluent 134, which may include at least a portion of the steam 133 introduced to the stripping zone 132, can be discharged from the stripping zone 132, at which point stripped effluent 134 can pass through cyclone separators (not shown) and out of the stripper vessel (not shown). The stripped effluent 134 can be directed to one or more product recovery systems in accordance with known methods in the art. The stripped effluent 134 may also be combined with one or more other streams, such as the cracked effluent 126. The used FCC catalyst 125, after having been stripped of at least a portion of the retained portions of the cracked effluent 126, can be then passed to the regeneration zone 162 of the regenerator 160.

The used FCC catalyst 125 and a combustion gas 170 can be introduced to a bottom end of the riser 166 of the regenerator 160. The combustion gases 170 can include one or more of combustion air, oxygen, fuel gas, fuel oil, or combinations of these. The combustion gases 170 can convey the used FCC catalyst 125 upwards through the riser 166 to the regeneration zone 162, where coke deposits and residual reactants and reaction products are at least partially oxidized (combusted). The coke deposited on the used FCC catalyst 125 in the cracking reaction zone 122 may begin to oxidize in the presence of the combustion gases 170 in the riser 166 on the way upward to the regeneration zone 162.

The used FCC catalyst 125 is regenerated to produce a regenerated FCC catalyst 123. During regeneration, the coke deposits on the used FCC catalyst 125 are removed and the catalyst particles are heated through combustion of the coke deposits, an additional fuel gas, or combinations of these to produce the regenerated FCC catalyst 123. The regenerated FCC catalyst 123 is then passed back to the cracking reaction zone 122 as the FCC catalyst composition 124.

As noted previously, embodiments of the present disclosure include contacting the hydrocarbon feed 102 with the FCC catalyst composition 124 that includes ZSM-5 zeolite impregnated with phosphorous, USY zeolite impregnated with lanthanum oxide, an alumina binder, colloidal silica, and a matrix material comprising Kaolin clay. The inclusion of two or more different zeolitic components can increase the selectivity and yield of the FCC process for producing light olefins across the entire range of some unconventional hydrocarbon feeds for fluid catalytic cracking processes, such as crude oil. The FCC catalyst composition 124 may be particularly suited for catalytically cracking crude oil under high-severity reaction conditions to produce increased olefin yield compared to conventional FCC catalysts. Without being bound by any particular theory, it is believed that the different zeolitic components can be active enough to promote the catalytic cracking of lighter hydrocarbons and mild enough to avoid the excessive catalytic cracking, such as continued cracking of light olefin and light aromatic product compounds. This balanced activity provided by the mixture of zeolite components can increase the yield of products, such as light olefins, from the catalytic cracking of both light hydrocarbons and heavy hydrocarbons present in crude oil.

Further, embodiments of the present disclosure may provide catalysts with a reduced deactivation rate during catalytic cracking of crude oil that is added directly to the FCC system. The reduced deactivation rate of the catalyst may improve the economics of catalytically cracking crude oil to form light olefins, among other features.

EXAMPLES

The various aspects of the present disclosure will be further clarified by the following examples. The examples are illustrative in nature and should not be understood to limit the subject matter of the present disclosure.

Example 1: Preparation of FCC Catalyst Composition

In Example 1, an FCC catalyst composition according to the present disclosure was prepared. The materials used in preparing the FCC catalyst composition of Example 1 are provided below in Table 2.

TABLE 2

| Chemical | Supplier |
| --- | --- |
| LUDOX ® TM40 colloidal silica (SiO$_2$) | DuPont |
| Sodium hydroxide (NaOH) | Sigma Aldrich |
| Y zeolite (CBV-780) | Zeolyst International |
| ZSM-5 zeolite (CBV-3024E) | Zeolyst International |
| Formic acid | Sigma Aldrich |
| Clay | Petrobras |
| Alumina, PURAL ™ SB Grade | Petrobras |
| Diammonium hydrogen phosphate | Sigma Aldrich |
| Lanthanum nitrate (III) hydrate | Fluka |

To prepare the FCC catalyst composition of Example 1, the ZSM-5 zeolite (commercially available as CBV-3024-E from Zeolyst International) was impregnated with 7.5 wt. % phosphorous pentoxide, and the USY zeolite (commercially available as CBV-780 from Zeolyst International) was impregnated with 2.5 wt. % lanthanum oxide. The ZSM-5 zeolite had an average silica-to-alumina ratio of 30 and an average surface area of 405 m$^2$/g. The USY zeolite had an average total pore volume per unit weight of 0.486 cm$^3$/g. The ZSM-5 zeolite impregnated with phosphorous pentoxide and the USY zeolite impregnated with lanthanum oxide were combined with water, the alumina binder, the colloidal silica, and the Kaolin clay to produce a mixture. The mixture was stirred for 1 hour and the resulting slurry was placed in a temperature-programmed oven for drying and calcination to produce FCC catalyst composition particles. The FCC catalyst composition particles were ground to a fine powder by means of a mortar and a pestle. Then, the ground FCC catalyst composition microparticles were sieved for a fraction between 40-120 micrometers (μm) and used for characterization and evaluation. The composition of the FCC catalyst composition microparticles of Example 1 is provided in Table 3.

TABLE 3

| Component | Weight % | Notes |
| --- | --- | --- |
| ZSM-5 | 20 | Phosphorus impregnated at 7.5 wt % P$_2$O$_5$ on zeolite |
| USY | 21 | Lanthanum impregnated at 2.5 wt % La$_2$O$_3$ on zeolite |
| Alumina | 8 | Pural SB from Sasol |
| Clay | 49 | Kaolin |
| Silica | 2 | Added as colloidal silica Ludox TM-40 |

Example 2: Evaluation of FCC Catalyst Composition of Example 1

In Example 2, the performance of the FCC catalyst composition of Example 1 was evaluated for cracking Arab light crude oil under various reaction conditions. The properties of Arab light crude oil utilized in the examples were previously shown in Table 1. The catalytic cracking of Arab Light (AL) crude oil with the FCC catalyst composition of Example 1 was carried out in a Sakuragi Rikagaku (Japan) Micro Activity Test (MAT) instrument using a quartz tubular reactor. The FCC catalyst composition of Example 1 was evaluated for cracking Arab light crude oil according to standard test method ASTM D-3907. Prior to evaluation, the FCC catalyst composition was steamed at 810° C. for 6 hours prior to conducting the cracking reactions. The experiments were conducted in the MAT unit at 30 seconds time-on-stream (TOS). The cracking reactions were conducted at temperatures of 600° C., 625° C., and 650° C. and at catalyst to oil weight ratios of about 2, about 5, and about 9.

After each reaction, the FCC catalyst composition microparticles were stripped using nitrogen (N$_2$) at a flow rate of 30 milliliters per minute (mL/min). The liquid product was collected in a liquid receiver and the gaseous products were collected in a gas burette by water displacement and sent to the gas chromatograph (GC) for analysis. The used catalysts were used to measure the amount of generated coke from the reaction.

The MAT results from the cracking of AL crude oil over the FCC catalyst composition of Example 1 are shown in Table 4. As can be seen, high light olefin yields of greater than 21 wt. % were obtained using the FCC catalyst composition of Example 1. Reaction conditions of 650° C. and a catalyst-to-oil ratio of 9.17 achieved the greatest light olefin yield of 38.45 wt. % (Ex. 2-3).

TABLE 4

| RUN No. | Ex.2-1 | Ex.2-2 | Ex.2-3 | Ex.2-4 | Ex.2-5 | Ex.2-6 | Ex.2-7 | Ex.2-8 | Ex.2-9 |
|---|---|---|---|---|---|---|---|---|---|
| Temp. (° C.) | 650.00 | 650.00 | 650.00 | 625.00 | 625.00 | 625.00 | 600.00 | 600.00 | 600.00 |
| T.O.S.(s) | 30.00 | 30.00 | 30.00 | 30.00 | 30.00 | 30.00 | 30.00 | 30.00 | 30.00 |
| Catalyst | Ex.1 | Ex.1 | Ex.1 | Ex.1 | Ex.1 | Ex.1 | Ex.1 | Ex.1 | Ex.1 |
| Steaming conditions | 810 C./ 6 h | 810 C./ 6 h | 810 C./ 6 h | 810 C./ 6 h | 810 C./ 6 h | 810 C./ 6 h | 810 C./ 6 h | 810 C./ 6 h | 810 C./ 6 h |
| Feed code | AL Crude | AL Crude | AL Crude | AL Crude | AL Crude | AL Crude | AL Crude | AL Crude | AL Crude |
| CTO Ratio | 2.36 | 5.55 | 9.17 | 2.33 | 5.66 | 9.11 | 2.24 | 5.51 | 9.07 |
| Conversion (%) (total gas + coke) | 32.81 | 50.67 | 60.34 | 38.28 | 50.13 | 56.26 | 26.83 | 46.19 | 55.04 |
| Conversion (%) (100-LCO-HCO) | 69.75 | 84.62 | 86.12 | 75.22 | 82.07 | 84.87 | 67.92 | 83.95 | 85.35 |
| Yields (wt. %) | (wt. %) | (wt. %) | (wt. %) | (wt. %) | (wt. %) | (wt. %) | (wt. %) | (wt. %) | (wt. %) |
| H2 | 0.22 | 0.24 | 0.29 | 0.24 | 0.41 | 0.60 | 0.13 | 0.40 | 0.43 |
| C1 | 2.15 | 3.06 | 4.93 | 2.29 | 2.41 | 2.91 | 0.89 | 1.37 | 2.21 |
| C2 | 1.54 | 2.43 | 3.66 | 1.99 | 2.02 | 2.33 | 0.79 | 1.20 | 2.00 |
| C2= | 4.72 | 8.27 | 11.77 | 5.87 | 7.93 | 9.81 | 2.82 | 6.29 | 9.21 |
| C3 | 0.97 | 2.15 | 3.61 | 1.33 | 2.50 | 3.49 | 0.98 | 3.06 | 5.01 |
| C3= | 11.48 | 17.48 | 18.46 | 13.95 | 18.20 | 18.78 | 10.31 | 16.13 | 16.41 |
| iC4 | 0.47 | 0.95 | 1.23 | 0.49 | 1.46 | 1.85 | 0.62 | 2.46 | 2.93 |
| nC4 | 0.48 | 0.88 | 1.17 | 0.59 | 1.08 | 1.37 | 0.57 | 1.43 | 1.94 |
| t2C4= | 1.81 | 2.17 | 1.81 | 1.99 | 2.30 | 2.07 | 1.80 | 2.23 | 1.92 |
| 1C4= | 1.61 | 2.02 | 1.75 | 1.81 | 2.13 | 1.95 | 1.53 | 1.96 | 1.71 |
| iC4= | 2.97 | 3.55 | 2.98 | 3.27 | 3.79 | 3.40 | 3.05 | 3.77 | 3.20 |
| c2C4= | 1.51 | 1.84 | 1.55 | 1.65 | 1.95 | 1.76 | 1.49 | 1.87 | 1.62 |
| 1,3-BD | 0.10 | 0.11 | 0.11 | 0.10 | 0.10 | 0.09 | 0.06 | 0.06 | 0.06 |
| C4=(Liq.) | 0.12 | 0.04 | 0.03 | 0.11 | 0.09 | 0.04 | 0.07 | 0.19 | 0.07 |
| Total Gas | 30.14 | 45.20 | 53.35 | 35.65 | 46.36 | 50.46 | 25.11 | 42.43 | 48.71 |
| Gasoline | 36.94 | 33.95 | 25.78 | 36.94 | 31.94 | 28.61 | 41.08 | 37.75 | 30.32 |
| LCO | 19.77 | 12.72 | 9.59 | 17.93 | 13.33 | 10.93 | 20.65 | 13.96 | 10.50 |
| HCO | 10.48 | 2.66 | 4.29 | 6.85 | 4.60 | 4.20 | 11.43 | 2.09 | 4.15 |
| Coke | 2.68 | 5.47 | 6.99 | 2.63 | 3.77 | 5.80 | 1.72 | 3.77 | 6.33 |
| Groups (wt. %) | (wt. %) | (wt. %) | (wt. %) | (wt. %) | (wt. %) | (wt. %) | (wt. %) | (wt. %) | (wt. %) |
| H2-C2 (dry gas) | 8.63 | 14.01 | 20.65 | 10.38 | 12.77 | 15.66 | 4.64 | 9.27 | 13.85 |
| C3-C4 (LPG) | 21.51 | 31.19 | 32.69 | 25.27 | 33.59 | 34.80 | 20.47 | 33.16 | 34.86 |
| C2= - C4= (Light olefins) | 24.31 | 35.49 | 38.45 | 28.74 | 36.48 | 37.90 | 21.12 | 32.50 | 34.20 |
| C3= + C4= | 19.59 | 27.21 | 26.68 | 22.87 | 28.55 | 28.09 | 18.30 | 26.20 | 24.99 |
| C4= (Butenes) | 8.12 | 9.74 | 8.23 | 8.91 | 10.36 | 9.32 | 7.99 | 10.07 | 8.59 |

As seen in Table 4, increasing the catalyst-to-oil ratio at a fixed temperature resulted in an increased yield of propylene (C3=) and total yield of light olefins for catalyst-to-oil ratios of up to about 9. Increasing the reaction temperature from 600° C. to 625° C. at a fixed catalyst-to-oil ratio resulted in an increase in the propylene, ethylene, and light olefins yield. However, increasing the reaction temperature from 625° C. to 650° C. resulted in a slight decrease in the propylene yield and slight increase in the light olefins yield. Further, increasing the reaction temperature from 625° C. to 650° C. resulted in an increase in the ethylene yield. At temperatures greater than to 650° C., it is believed an increase in thermal cracking decreases the propylene yield and increases the ethylene yield, as shown by the trend of decreasing propylene and increasing ethylene when the temperature is increased from 625° C. to 650° C. At temperatures less than 600° C., the production of gasoline components is emphasized and the yields of light olefins is lower.

Comparative Example 3: Evaluation of Comparative FCC Catalyst Compositions

In Comparative Example 3, the performance of commercial FCC catalyst compositions were evaluated for cracking Arab light crude oil at a reaction temperature of 625° C. and a catalyst-to-oil ratio of about 9. Comparative Example 3-1 uses a commercial catalyst based on ZSM-5 zeolite available as OlefinsUltra from GRACE. Comparative Example 3-2 uses an Ecat based on Y zeolite. Comparative Example 3-3 uses an Ecat based on ZSM-5 and Y zeolites. The catalytic cracking of Arab Light (AL) crude oil with the commercial FCC catalyst compositions of Comparative Example 3 were carried out as described in Example 2. The MAT results from the cracking of AL crude oil over the commercial FCC catalyst compositions of Comparative Example 3 are shown in Table 5.

TABLE 5

| RUN No. | Comp. Ex. 3-1 | Comp. Ex. 3-2 | Comp. Ex. 3-3 | Ex. 2-6 |
|---|---|---|---|---|
| Temp. (° C.) | 625.00 | 625.00 | 625.00 | 625.00 |
| T.O.S.(s) | 30.00 | 30.00 | 30.00 | 30.00 |
| Catalyst | Commercial catalyst based on ZSM-5 zeolite | Commercial catalyst based on Y zeolite | Commercial catalyst based on ZSM-5 and Y zeolites | Ex. 1 |

TABLE 5-continued

| RUN No. | Comp. Ex. 3-1 | Comp. Ex. 3-2 | Comp. Ex. 3-3 | Ex. 2-6 |
|---|---|---|---|---|
| Steaming conditions | 810 C./6 h | 810 C./6 h | 810 C./6 h | 810 C./6 h |
| Feed code | AL Crude | AL Crude | AL Crude | AL Crude |
| CTO Ratio | 9.22 | 9.18 | 9.12 | 9.11 |
| Conversion (%) (total gas + coke) | 43.01 | 56.15 | 57.87 | 56.26 |
| Conversion (%) (100 − LCO − HCO) | 68.62 | 85.22 | 86.78 | 84.87 |
| Yields (wt. %) | (wt. %) | (wt. %) | (wt. %) | (wt. %) |
| H2 | 0.273 | 0.265 | 0.442 | 0.60 |
| C1 | 3.08 | 3.00 | 3.70 | 2.91 |
| C2 | 3.45 | 3.10 | 3.42 | 2.33 |
| C2= | 9.50 | 10.86 | 8.47 | 9.81 |
| C3 | 6.43 | 6.36 | 4.42 | 3.49 |
| C3= | 9.95 | 14.74 | 16.72 | 18.78 |
| iC4 | 0.95 | 2.54 | 2.75 | 1.85 |
| nC4 | 1.12 | 1.90 | 1.51 | 1.37 |
| t2C4= | 0.89 | 1.53 | 1.90 | 2.07 |
| 1C4= | 0.82 | 1.34 | 1.65 | 1.95 |
| iC4= | 1.44 | 2.44 | 2.96 | 3.40 |
| c2C4= | 0.74 | 1.27 | 1.58 | 1.76 |
| 1,3-BD | 0.145 | 0.566 | 0.632 | 0.09 |
| C4=(Liq.) | 0.055 | 0.041 | 0.039 | 0.04 |
| Total Gas | 38.84 | 49.96 | 50.19 | 50.46 |
| Gasoline | 25.61 | 29.08 | 28.91 | 28.61 |
| LCO | 17.71 | 10.91 | 9.90 | 10.93 |
| HCO | 13.67 | 3.87 | 3.31 | 4.20 |
| Coke | 4.17 | 6.19 | 7.68 | 5.80 |
| Groups (wt. %) | (wt. %) | (wt. %) | (wt. %) | (wt. %) |
| H2 − C2 (dry gas) | 16.30 | 17.23 | 16.03 | 15.66 |
| C3 − C4 (LPG) | 22.54 | 32.73 | 34.16 | 34.80 |
| C2= − C4= (Light olefins) | 23.54 | 32.79 | 33.95 | 37.90 |
| C3= + C4= | 14.03 | 21.93 | 25.48 | 28.09 |
| C4= (Butenes) | 4.08 | 7.19 | 8.75 | 9.32 |

As can be seen in Table 5, the propylene and total light olefin yields using Example 2 (Ex. 2-6) were greater than the propylene and total light olefins yields using the catalysts of Comparative Example 3 under similar conditions.

Example 4: Estimate of Catalyst Deactivation for FCC Catalyst Composition of Example 1

In Example 4, the deactivation rate of the FCC catalyst composition of Example 1 is estimated. Industrially, FCC catalyst deactivation is evaluated based on nickel (Ni) and vanadium (V) content accumulated on the equilibrium catalyst (E-Cat). A catalyst can be considered E-Cat after it has circulated between the regenerator and the FCC reactor for days of continuous operation. The deactivation of the FCC catalyst is promoted mainly by two factors, namely steam and feed contaminants. Industrially, deactivation of the FCC catalyst is evaluated by withdrawing a sample of the E-Cat from the FCC system and analyzing the sample for Ni and V content. In Example 2 above, the FCC catalyst composition was passed once through the MAT unit and, therefore, may not be fully representative of an industrial E-Cat. Alternatively, the FCC catalyst composition of Example 1 was steam deactivated at 810° C. for 6 hours and, thus, can be considered representative of an industrial E-Cat.

Alongside steam deactivating the catalysts, established equations in the literature, which are based on the metals balance around the unit ($Metals_{in} - Metals_{out}$ = Metals Accumulated), are used to estimate how much Ni and V would accumulate on the FCC catalyst composition of Example 1 at an equilibrium state. For instance, Fluid Catalytic Cracking Handbook, 4$^{th}$ Edition, Sadeghbeigi, 2020 provides equations for estimating Ni and V accumulation on FCC catalysts. These equations estimate Ni and V content on the E-Cat based on their level in the feed (AL crude in these examples) and a daily catalyst addition rate. A first order differential equation (Eqn. 1) with the solution: $C_a M_e$ is shown below:

$$M_e = A + [M_0 - A] \times e^{-\left(\frac{-C_a \times T}{I}\right)}; \quad \text{(Eqn. 1)}$$

where:

$M_e$ = E-cat metals content, parts per million by weight (ppmw);

$A = (W \times M_f)/C_a$;

W = Feed rate, pounds per day (lb/day);

$M_f$ = Feed metals, ppmw;

$C_a$ = Catalyst addition rate, lb/day;

$M_0$ = Initial metals on the E-cat, ppmw;

T = time, day;

I = Catalyst inventory, pounds (lb.); and

B = Catalyst addition rate, pounds of catalyst per barrel of feed, where a barrel is equal to 42 U.S. gallons.

At steady state, the concentration of any metal on catalyst is approximated using the following equation (Eqn. 2):

$$M_e = ((141.5/(131.5 + °API_{feed}) \times 350.4 \times M_f)/B \quad \text{(Eqn. 2)};$$

where $°API_{feed}$ = American Petroleum Institute gravity of the feed, degrees.

After implementing these equations above, it was found that the calculated Ni and V in the FCC catalyst composition of claim 1 at the equilibrium state are less than half their minimum amount in the E-Cat for it to be considered a used/deactivated catalyst. Specifically, the sum of the Ni and V should be around 10,000 ppm on the E-Cat to be considered a spent catalyst. The calculated amount of Ni+V of Example 1 was 4969 ppm. In comparison, a calculated Ni+V of an E-Cat FCC was 4086 ppm. The E-Cat is used in an operation that cracks a feed having a Ni+V of 10 ppm whereas the FCC catalyst composition of Example 1 is used in cracking AL crude having a Ni+V of approximately 13 ppm. The calculations for the Ni+V of both Example 1 and the comparative E-Cat were conducting using the same catalyst addition rate.

A first aspect of the present disclosure is directed to a process for converting crude oil to light olefins, aromatics, or both, the process comprising contacting a crude oil with a fluidized catalytic cracking (FCC) catalyst composition in an FCC system at a temperature of greater than or equal to 580° C., a weight ratio of the FCC catalyst composition to the crude oil of from 2:1 to 10:1, and a residence time of from 0.1 seconds to 60 seconds. The FCC catalyst composition comprises ultrastable Y-type zeolite (USY zeolite) impregnated with lanthanum, ZSM-5 zeolite impregnated with phosphorous, an alumina binder, colloidal silica, and a matrix material comprising Kaolin clay. The contacting causes at least a portion of hydrocarbons in the crude oil to undergo cracking reactions to produce a cracked effluent comprising at least olefins.

A second aspect of the present disclosure may include the first aspect, where the FCC catalyst composition comprises from 10 wt. % to 30 wt. % USY zeolite impregnated with lanthanum.

A third aspect of the present disclosure may include either one of the first or second aspects, where the FCC catalyst composition comprises from 10 wt. % to 30 wt. % ZSM-5 zeolite impregnated with phosphorous.

A fourth aspect of the present disclosure may include any one of the first through third aspects, where the USY zeolite is impregnated with from 1 wt. % to 5 wt. % lanthanum oxide based on the total weight of the USY zeolite.

A fifth aspect of the present disclosure may include any one of the first through fourth aspects, where the ZSM-5 zeolite is impregnated with from 1 wt. % to 15 wt. % phosphorous pentoxide based on the total weight of the ZSM-5 zeolite.

A sixth aspect of the present disclosure may include any one of the first through fifth aspects, where the FCC catalyst composition comprises 21 wt. % USY zeolite impregnated with lanthanum, 20 wt. % ZSM-5 zeolite impregnated with phosphorous, 8 wt. % alumina binder, 49 wt. % Kaolin clay, and 2 wt. % colloidal silica, where the weight percentages are based on the total weight of the FCC catalyst composition.

A seventh aspect of the present disclosure may include any one of the first through sixth aspects, where the crude oil has an American Petroleum Institute gravity from 15 degrees to 50 degrees.

An eighth aspect of the present disclosure may include any one of the first through seventh aspects, where the crude oil has a density of greater than 0.8 grams per milliliter at 15 degrees Celsius.

A ninth aspect of the present disclosure may include any one of the first through eighth aspects, where the crude oil has an initial boiling point from 30 degrees Celsius to 50 degrees Celsius and an end boiling point greater than 720 degrees Celsius.

A tenth aspect of the present disclosure may include any one of the first through ninth aspects, where at least 50 weight percent of the crude oil has a boiling point temperature greater than or equal to 300 degrees Celsius.

An eleventh aspect of the present disclosure may include any one of the first through tenth aspects, where the crude oil has a concentration of paraffin compounds of less than 50 wt. % per unit weight of the crude oil.

A twelfth aspect of the present disclosure may include any one of the first through eleventh aspects, where the crude oil has a concentration of aromatic compounds of greater than or equal to 20 wt. % per unit weight of the crude oil.

A thirteenth aspect of the present disclosure may include any one of the first through twelfth aspects, where the crude oil has a concentration of naphthenes of greater than or equal to 25 wt. % per unit weight of the crude oil.

A fourteenth aspect of the present disclosure may include any one of the first through thirteenth aspects, where the crude oil is an Arab light crude oil.

A fifteenth aspect of the present disclosure may include any one of the first through fourteenth aspects, where the crude oil is contacted with the FCC catalyst composition at a temperature of from 600° C. to 650° C.

A sixteenth aspect of the present disclosure may include any one of the first through fifteenth aspects, where the crude oil is contacted with the FCC catalyst composition for a residence time of from 20 seconds to 40 seconds.

A seventeenth aspect of the present disclosure may include any one of the first through sixteenth aspects, where the FCC unit is a downflow FCC unit.

An eighteenth aspect of the present disclosure may include any one of the first through seventeenth aspects, where the FCC catalyst composition comprises a plurality of catalyst particles, where each of the plurality of catalyst particles comprises the ZSM-5 zeolite impregnated with phosphorous, the USY zeolite impregnated with lanthanum, the alumina binder, the Kaolin clay, and the colloidal silica.

A nineteenth aspect of the present disclosure may be directed to a FCC catalyst composition comprising ultrastable Y-type zeolite (USY zeolite) impregnated with lanthanum, ZSM-5 zeolite impregnated with phosphorous, an alumina binder, colloidal silica, and a matrix material comprising Kaolin clay.

A twentieth aspect of the present disclosure may include the nineteenth aspect, where the FCC catalyst composition comprises 20 wt. % ZSM-5 zeolite based on the total weight of the FCC catalyst composition, 21 wt. % USY-type zeolite based on the total weight of the FCC catalyst composition, 8 wt. % alumina binder based on the total weight of the FCC catalyst composition, 49 wt. % Kaolin clay based on the total weight of the FCC catalyst composition, and 2 wt. % colloidal silica based on the total weight of the FCC catalyst composition. The ZSM-5 zeolite is impregnated with 7.5 wt. % $P_2O_5$ based on the total weight of the ZSM-5 zeolite. The USY-type zeolite comprises 2.5 wt. % lanthanum oxide ($La_2O_3$) based on the total weight of the USY-type zeolite.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for converting crude oil to light olefins, aromatics, or both, the process comprising contacting a crude oil with a fluidized catalytic cracking (FCC) catalyst composition in an FCC system at a temperature of greater than or equal to 580° C., a weight ratio of the FCC catalyst composition to the crude oil of from 2:1 to 10:1, and a residence time of from 0.1 seconds to 60 seconds, where:
   the FCC catalyst composition comprises a plurality of microparticles, where each of the plurality of microparticles comprises:
      ultrastable Y-type zeolite (USY zeolite) impregnated with lanthanum;
      ZSM-5 zeolite impregnated with phosphorous;
      an alumina binder;
      colloidal silica; and
      a matrix material comprising Kaolin clay;
   the crude oil has an initial boiling point from 30 degrees Celsius to 50 degrees Celsius and an end boiling point greater than 720 degrees Celsius;
   the crude oil comprises less than 50 wt. % paraffin compounds per unit weight of the crude oil; and contacting causes at least a portion of hydrocarbons in the crude oil to undergo cracking reactions to produce a cracked effluent comprising at least olefins.

2. The process of claim 1, where the FCC catalyst composition comprises:
from 10 wt. % to 30 wt. % USY zeolite impregnated with lanthanum;
from 10 wt. % to 30 wt. % ZSM-5 zeolite impregnated with phosphorous;
or combinations thereof.

3. The process of claim 1, where the USY zeolite is impregnated with from 1 wt. % to 5 wt. % lanthanum oxide based on the total weight of the USY zeolite.

4. The process of claim 1, where the ZSM-5 zeolite is impregnated with from 1 wt. % to 15 wt. % phosphorous pentoxide based on the total weight of the ZSM-5 zeolite.

5. The process of claim 1, where the FCC catalyst composition comprises 21 wt. % USY zeolite impregnated with lanthanum, 20 wt. % ZSM-5 zeolite impregnated with phosphorous, 8 wt. % alumina binder, 49 wt. % Kaolin clay, and 2 wt. % colloidal silica, where the weight percentages are based on the total weight of the FCC catalyst composition.

6. The process of claim 1, where the crude oil has an American Petroleum Institute gravity from 15 degrees to 40 degrees.

7. The process of claim 1, where the crude oil has a density of greater than 0.8 grams per milliliter at 15 degrees Celsius.

8. The process of claim 1, where the crude oil has a 50 weight percent boiling point temperature of greater than or equal to 350 degrees Celsius to less than or equal to 400 degrees Celsius.

9. The process of claim 1, where the crude oil has a concentration of aromatic compounds of greater than or equal to 20 wt. % per unit weight of the crude oil.

10. The process of claim 1, where the crude oil has a concentration of naphthenes of greater than or equal to 25 wt. % per unit weight of the crude oil.

11. The process of claim 1, where the crude oil is an Arab light crude oil.

12. The process of claim 1, where the crude oil is contacted with the FCC catalyst composition at a temperature of from 600° C. to 650° C.

13. The process of claim 1, where the crude oil is contacted with the FCC catalyst composition for a residence time of from 20 seconds to 40 seconds.

14. The process of claim 1, where the FCC unit is a downflow FCC unit.

15. The process of claim 1, where the FCC catalyst composition comprises a plurality of catalyst particles, where each of the plurality of catalyst particles comprises the ZSM-5 zeolite impregnated with phosphorous, the USY zeolite impregnated with lanthanum, the alumina binder, the Kaolin clay, and the colloidal silica.

16. The process of claim 1, where the crude oil is a whole crude oil.

17. The process of claim 1, where the FCC catalyst composition comprises:
20 wt. % ZSM-5 zeolite based on the total weight of the FCC catalyst composition, where the ZSM-5 zeolite is impregnated with 7.5 wt. % $P_2O_5$ based on the total weight of the ZSM-5 zeolite;
21 wt. % USY-type zeolite based on the total weight of the FCC catalyst composition, where the USY-type zeolite comprises 2.5 wt. % lanthanum oxide ($La_2O_3$) based on the total weight of the USY-type zeolite;
8 wt. % alumina binder based on the total weight of the FCC catalyst composition;
49 wt. % Kaolin clay based on the total weight of the FCC catalyst composition; and
2 wt. % colloidal silica based on the total weight of the FCC catalyst composition.

18. The process of claim 1, where the crude oil comprises less than 40 wt. % paraffin compounds per unit weight of the crude oil.

19. The process of claim 1, where the crude oil has:
an American Petroleum Institute gravity from 15 degrees to 40 degrees;
an initial boiling point from 30 degrees Celsius to 50 degrees Celsius and an end boiling point greater than 720 degrees Celsius;
a 50 weight percent boiling point temperature of greater than or equal to 350 degrees Celsius to less than or equal to 400 degrees Celsius;
a concentration of aromatic compounds of greater than or equal to 20 wt. % per unit weight of the crude oil; and
a concentration of naphthenes of greater than or equal to 25 wt. % per unit weight of the crude oil.

* * * * *